(12) United States Patent
Schulz

(10) Patent No.: US 11,155,420 B2
(45) Date of Patent: Oct. 26, 2021

(54) TRANSFER SYSTEM, TRANSPORT SYSTEM AND METHOD FOR REMOVING SLEEVE-SHAPED WORKPIECES FROM A FIRST CONVEYOR AND FOR PUSHING THE SLEEVE-SHAPED WORKPIECES ONTO A SECOND CONVEYOR

(71) Applicant: Hinterkopf GmbH, Eislingen/Fils (DE)

(72) Inventor: Josef Schulz, Bad Ditzenbach-Gosbach (DE)

(73) Assignee: HINTERKOPF GMBH, Eislingen/Fils (DE)

( * ) Notice: Subject to any disclaimer, the term of this patent is extended or adjusted under 35 U.S.C. 154(b) by 0 days.

(21) Appl. No.: 16/910,700

(22) Filed: Jun. 24, 2020

(65) Prior Publication Data

US 2021/0002084 A1 Jan. 7, 2021

(30) Foreign Application Priority Data

Jun. 24, 2019 (EP) ..................................... 19181969

(51) Int. Cl.
*B65G 47/68* (2006.01)
*B65G 47/84* (2006.01)
(Continued)

(52) U.S. Cl.
CPC ......... *B65G 47/681* (2013.01); *B65G 47/848* (2013.01); *B65G 47/902* (2013.01);
(Continued)

(58) Field of Classification Search
CPC ........ B41J 3/40733; B41J 3/4073; B41J 2/01; B65G 47/848; B65G 2201/0252;
(Continued)

(56) References Cited

U.S. PATENT DOCUMENTS 5,231,926 A * 8/1993 Williams ................ B41F 17/22
101/40
5,272,970 A * 12/1993 Burke .................... F26B 15/128
101/37
(Continued)

FOREIGN PATENT DOCUMENTS

DE 10261127 A1 7/2004
EP 1132207 A1 9/2001
(Continued)

*Primary Examiner* — Mark A Deuble
(74) *Attorney, Agent, or Firm* — Hoffmann & Baron, LLP

(57) ABSTRACT

Transfer system for removing sleeve-shaped workpieces from a first conveyor and for pushing the sleeve-shaped workpieces onto a second conveyor, with a linearly movable coupling rod, with which a gear unit is associated, which includes a swivel body mounted so as to be pivotable about an axis of movement, on which a first workpiece gripper mounted so as to be rotatable about a first axis of rotation and a second workpiece gripper are arranged, wherein the gear unit has an adjuster for initiating an actuating movement for setting a distance between a first gripping region of the first workpiece gripper, which is arranged at a radial distance from the axis of movement, and a second gripping region of the second workpiece gripper, which is arranged at a radial distance from the axis of movement, as well as with a swivel drive for actuating the adjuster for initiating a forced swivel movement connected to the swivel movement of the swivel body onto the first workpiece gripper.

11 Claims, 2 Drawing Sheets

(51) Int. Cl.
*B65G 47/90* (2006.01)
*B65G 47/91* (2006.01)

(52) U.S. Cl.
CPC ......... *B65G 47/914* (2013.01); *B65G 47/915* (2013.01); *B65G 2201/0252* (2013.01)

(58) Field of Classification Search
CPC .. B65G 47/902; B65G 47/915; B65G 47/914; B65G 47/907
See application file for complete search history.

(56) References Cited

U.S. PATENT DOCUMENTS

| | | | |
|---|---|---|---|
| 9,033,132 B2 * | 5/2015 | Goeb | B65G 47/848 |
| | | | 198/608 |
| 2001/0025572 A1 * | 10/2001 | Aichele | B41F 17/22 |
| | | | 101/35 |
| 2009/0183970 A1 | 7/2009 | Ramminger | |
| 2011/0232514 A1 * | 9/2011 | Putzer | B41J 3/40733 |
| | | | 101/36 |
| 2014/0352612 A1 * | 12/2014 | Persico | B05B 13/0609 |
| | | | 118/317 |
| 2018/0127218 A1 * | 5/2018 | Kalany | B65G 47/252 |
| 2018/0178989 A1 * | 6/2018 | Drexler | B65G 47/915 |

FOREIGN PATENT DOCUMENTS

| | | | | |
|---|---|---|---|---|
| EP | 2562103 A1 | 2/2013 | | |
| EP | 2840046 A1 | 2/2015 | | |
| GB | 2067501 A | * | 7/1981 | ............. B41F 17/14 |

\* cited by examiner

TRANSFER SYSTEM, TRANSPORT SYSTEM AND METHOD FOR REMOVING SLEEVE-SHAPED WORKPIECES FROM A FIRST CONVEYOR AND FOR PUSHING THE SLEEVE-SHAPED WORKPIECES ONTO A SECOND CONVEYOR

BACKGROUND OF THE INVENTION

The invention relates to a transfer system for removing sleeve-shaped workpieces from a first conveyor and for pushing the sleeve-shaped workpieces onto a second conveyor.

A conveyor for conveying workpieces is known from EP 2 840 046 A1, with a rotor mounted so as to be rotatable about a rotor axis, with a rotary drive for initiating a rotational movement on the rotor and with at least one workpiece holder group comprising at least two workpiece holders attached to the rotor, which are designed to receive workpieces at a receiving position at least in pairs and to discharge workpieces at a discharge position at least in pairs during the rotational movement of the rotor, and with adjusting means which are coupled to at least one workpiece holder of a workpiece holder group and which are designed for cyclical adjustment of a spacing of workpiece holders of the workpiece holder group as a function of the rotational movement of the rotor.

SUMMARY OF THE INVENTION

The task of the invention is to provide a transfer system, a transport system and a method for removing sleeve-shaped workpieces from a first conveyor and for pushing the sleeve-shaped workpieces onto a second conveyor, which enables an improved adjustment to different conveyors.

This task is solved for a transfer system, wherein the transfer system comprises a linear drive, which comprises a drive housing and a coupling rod, which is accommodated on the drive housing in a linearly movable manner, for providing a linear movement along an axis of movement, wherein a gear unit is arranged at an end region of the coupling rod remote from the drive housing, which gear unit comprises a swivel body, which is mounted in a pivotable manner about the axis of movement and on which a first workpiece gripper, which is mounted in a rotatable manner about a first axis of rotation, and a second workpiece gripper are arranged, and wherein the gear unit comprises an adjuster, which is designed to initiate an actuating movement for setting a distance between a first gripping region of the first workpiece gripper, which is arranged at a distance in the radial direction from the axis of movement, and a second gripping region of the second workpiece gripper, which is arranged at a distance in the radial direction from the axis of movement, and having a swivel drive, which comprises a swivel drive housing coupled to the drive housing and a swivel shaft mounted on the swivel drive housing so as to be swivellably movable, the swivel shaft being designed for initiating a swivelling movement on the swivel body and for activating the adjuster for initiating a forced swivelling movement connected with the swivelling movement on the first workpiece gripper.

The linear drive serves to provide the linear movement with which workpieces are removed from first mandrels of a first conveyor and the workpieces are pushed onto second mandrels of a second conveyor. The first mandrels and the second mandrels are aligned parallel to one another. It is assumed that the workpieces are sleeve-shaped, preferably thin-walled bodies, particularly with a closed base area, e.g. can blanks made of aluminium or plastic tube blanks. The workpieces can be processed in a production line with the aid of the first conveyor and with the aid of the second conveyor and with associated processing machines such as printing units or painting units. The linear drive can be designed as a pneumatic cylinder or hydraulic cylinder or preferably as an electromechanical drive. For example the linear drive comprises an electric gear motor, the motor housing of which serves as a drive housing and can be fixed to a machine frame. The rotational movement of a sprocket wheel or a belt pulley attached to the output shaft of the electric gear motor is converted via a traction means, for example a chain or toothed belt, into a linear movement of a linearly movably guided carriage. The carriage is connected to a coupling rod which serves to transmit the linear movement of the carriage. The coupling rod extends along an axis of movement and executes the linear movement, in particular a linear reversing movement, along the axis of movement.

At an end region of the coupling rod remote from the drive housing, a gear unit is arranged which carries the at least two workpiece grippers, each of the workpiece grippers being designed to grip a workpiece. The task of the gear unit is to provide a cyclical swivel movement for the at least two workpiece grippers, with which a displacement of the workpiece grippers and of the workpieces possibly picked up thereon can be effected between the first mandrels of the first conveyor and the second mandrels of the second conveyor.

For this purpose, the gear unit comprises a swivel body mounted so as to be pivotable about the axis of movement, on which the at least two workpiece grippers are mounted. As an example, it is provided that the swivel body is mounted on the coupling rod so that it can swivel through a pre-determinable range of a swivel angle. Each of the workpiece grippers has a gripping area designed to hold a respective workpiece. The gripping ranges of the workpiece grippers are each arranged in a radial direction away from the axis of movement, preferably the gripping ranges each have an identical radial distance from the axis of movement. It is advantageous if a first connecting line, which extends between a first gripping region and the axis of movement and a second connecting line, which extends between a second gripping region and the axis of movement each have an identical, possibly variable, length and limit a predeterminable, in particular variable, acute angle.

In order to enable an adaptation of a distance between the two workpiece grippers and thus an adaptation to different pitches of the first mandrels of the first conveyor and the second mandrels of the second conveyor, the first workpiece gripper is mounted on the swivelling body so as to be rotatable about a first axis of rotation. A predeterminable distance is provided between the axis of rotation and the first gripping area of the first workpiece gripper. Preferably, the first rotary axis is aligned parallel to the movement axis. An influence on a swivel position of the first workpiece gripper relative to the second workpiece gripper, which can be arranged fixedly on the swivel body, for example, is effected with the aid of an adjuster associated with the gear unit, which is designed to initiate an adjusting movement to set a distance between the first gripping range of the first workpiece gripper, which is arranged at a radial distance from the axis of movement, and the second gripping range of the second workpiece gripper, which is arranged at a radial distance from the axis of movement.

A swivel movement for the adjuster is provided by means of a swivel drive, which comprises a swivel drive housing coupled to the drive housing and a swivel shaft mounted on the swivel drive housing so as to be swivellable. As an example, the swivel drive is designed as an electric gear motor, the swivel shaft of the swivel drive being able to perform a swivel movement and being designed to initiate a swivel movement on the swivel body. When the adjuster is actuated by the swivel drive, the swivel movement is initiated on the swivel body and a forced swivel movement is initiated on the first workpiece gripper in order to thereby effect the distance adjustment between the first workpiece gripper and the second workpiece gripper.

It is preferably provided that a drive housing of the swivel drive is kinematically connected, in particular rigidly via a machine frame, to a drive housing of the linear drive.

It is expedient if the adjuster comprises a guidance which is non-rotatably connected to the coupling rod and which comprises at least one control surface in order to effect the forced pivoting movement as a function of the pivoting movement during a pivoting movement of the pivoting body and the first and second workpiece grippers arranged thereon. The guidance serves to provide a forced movement for the first workpiece gripper so that the latter can ensure the change in distance relative to the second workpiece gripper for adaptation to different pitches of the first mandrels of the first conveyor and the second mandrels of the second conveyor. As an example, the guidance is designed as a cam disc which comprises a control surface which is flat in at least some areas and/or curved in at least some areas. It is preferably provided here that one or more radii of curvature, in particular all radii of curvature which the control surface has, are aligned in relation to central axes which are in turn aligned parallel to the axis of movement. With the aid of the control surface, an inevitable dependence for the forced swivel movement of the first workpiece gripper during the swivel movement of the swivel body with respect to the axis of movement can be ensured.

It is preferably provided that the guidance has a control groove encompassing the control surface and that the first workpiece gripper engages in the control groove with a guide means, in particular with a guide roller. This ensures reliable positive control for the first workpiece gripper when performing the swivel movement of the swivel body relative to the axis of movement. Preferably, the control slot is incorporated in a control plate belonging to the guidance, which can also be called a cam plate. The guide means is preferably designed in the form of a pin which engages in the control groove and has a radially outer circumferential surface which lies against the control surface of the control groove. It is preferably provided that a guide roller is assigned to the guide means designed as a pin, so that a low-friction rolling friction occurs during a relative movement between the guide means and the control surface.

According to an embodiment of the invention it is provided that the second workpiece gripper is mounted on the swivel body so as to be rotatable about a second axis of rotation. Preferably it is provided that the first axis of rotation of the first workpiece gripper and the second axis of rotation of the second workpiece gripper are each arranged with identical radial spacing parallel to the axis of movement. If the second workpiece gripper is rotatably mounted on the swivel body, it can be provided that a change in distance between the first workpiece gripper and the second workpiece gripper is realized by a respective opposite approaching or removing movement between the two workpiece grippers. Thus, each of the two workpiece grippers only has to sweep half the swivel angle that the first workpiece gripper alone would otherwise have to sweep in order to achieve the desired distance adjustment between the two workpiece grippers. Due to this measure a significant reduction in the angular acceleration for the respective workpiece gripper and any workpiece picked up by the workpiece gripper can be achieved.

The gear unit is preferably designed for a distance adjustment between a gripping range of the first workpiece gripper arranged at a distance from the first axis of rotation and a gripping range of the second workpiece gripper arranged at a distance from the second axis of rotation, depending on a swivel angle of the swivel body with respect to the axis of movement.

According to another embodiment of the invention, it is provided that the first workpiece gripper and the second workpiece gripper each comprise a gripper which has a recess which is designed for a temporary fixing of a base region of the workpiece which region is aligned transversely to the axis of movement and/or a sleeve section of the workpiece which section is aligned parallel to the axis of movement, wherein an axis of extension of the recess is aligned parallel to the axis of movement. The gripper can, for example, be designed as a vacuum suction system or as a pneumatically or electrically or hydraulically actuated collet chuck. For this purpose, corresponding gripping systems are formed in the recess of the gripper. The gripper makes it possible to grip and temporarily fix the workpiece at a sleeve section facing the respective workpiece gripper and/or at a bottom area, in particular a circularly designed bottom area facing the respective workpiece gripper. Here, gripping forces which can be exerted by the gripper on the workpiece are dimensioned in such a way that the longitudinal acceleration along the axis of movement when the workpiece is pulled off and the transverse accelerations when the workpiece is displaced between the first conveyor and the second conveyor can be reliably supported.

The task of the invention is solved for a transport system of the type mentioned above with the following features: the transport system comprises a first conveyor which comprises a plurality of first mandrels with a first pitch and which is adapted to provide a circulating movement of the first mandrels along a first transport path, and a second conveyor which comprises a plurality of second mandrels with a second pitch and which is adapted to provide a circulating movement of the second mandrels along a second transport path, wherein the first conveyor and the second conveyor are arranged in transport planes aligned parallel to one another at least in a transfer region in which the first transport path and the second transport path have a minimum distance, and with a transfer system according to the invention which is associated with the transfer region, which transfer system is designed to withdraw sleeve-shaped workpieces from the first mandrels of the first conveyor and to push the sleeve-shaped workpieces onto the mandrels of the second conveyor.

As an example, the first conveyor is designed as a rotary indexing table which comprises a plurality of first mandrels which are arranged parallel to an axis of rotation of the rotary indexing table at an identical radial distance and at an identical angular pitch to the axis of rotation. In this way, the first conveyor determines a circular transport path, whereby one or more processing systems can be assigned to the transport path, which, for example, enable surface treatment of the workpiece, such as printing or painting of an external workpiece surface. Preferably, it is intended that the first conveyor is operated with an intermittent rotary step movement, in which the first mandrels are each conveyed on the transport path between fixed predetermined stopping positions, whereby at the stopping positions, for example, processing of the workpieces or removal of the workpieces can take place.

The second conveyor may be designed as a chain conveyor, in which a transport chain comprises a plurality of rod-shaped second mandrels, a pitch between adjacent mandrels corresponding to an integral multiple of a pitch of chain joints of the transport chain. Such a transport chain can be guided over a plurality of sprockets which are preferably arranged in a common second transport plane and can be used, for example, as a workpiece storage system and/or for transporting the workpieces to a subsequent machining system. The second conveyor is preferably provided for a continuous transport of workpieces, in which the transport chain is moved at a constant rotational speed.

As an example, it is provided that the first conveyor and the second conveyor are arranged in transport planes aligned parallel to each other at least in a transfer area in which the first transport path and the second transport path have a minimum distance. It is particularly preferred that the two conveyors are arranged in a common transport plane at least in some areas of the transfer area. A transfer system in accordance with the invention is assigned to the transfer area, which is designed for removing sleeve-shaped workpieces from the first mandrels of the first conveyor and for pushing the sleeve-shaped workpieces onto the mandrels of the second conveyor. The transfer system thus serves to provide workpieces, which are transported by the first conveyor, to the second conveyor. Here the transfer system enables on the one hand an adjustment between different pitches of the first mandrels of the first conveyor and the second mandrels of the second conveyor. On the other hand, the transfer system can be used to provide workpieces from a discontinuously operating first conveyor to a continuously operating second conveyor. The above descriptions of the first conveyor and the second conveyor can also exist in exactly the opposite way, so that the first conveyor conveys continuously and the second conveyor operates discontinuously. It may also be provided that both conveyors operate discontinuously or continuously.

In the case of an advantageous further embodiment of the transport system, it is provided that the gear unit is designed for a change in distance between the first workpiece gripper and the second workpiece gripper for adaptation to a pitch of the first conveyor and for adaptation to a pitch of the second conveyor.

The task of the invention is solved according to a third aspect of the invention with a method for removing sleeve-shaped workpieces from a first conveyor and for pushing the sleeve-shaped workpieces onto a second conveyor. The method comprises the following steps: providing workpieces with a first conveyor, which has a plurality of first mandrels with a first pitch, with a continuous or discontinuous conveying movement at a transfer region, removing two workpieces at a time from the first mandrels with a first linear movement, which is carried out along an axis of movement, with at least two workpiece grippers of a transfer system, wherein a spacing of the workpiece grippers is adapted to the first pitch, carrying out a pivoting movement of the workpiece grippers about the axis of movement, wherein the distance between the workpiece grippers is adapted to a second pitch of a plurality of second mandrels of a second conveyor, pushing the two workpieces onto the second mandrels of the second conveyor with a second linear movement which is carried out along an axis of movement in a direction opposite to the first linear movement, wherein the second conveyor carries out a continuous or discontinuous conveying movement and wherein the first mandrels and the second mandrels are aligned parallel to one another in the transfer region and are arranged in planes of movement aligned parallel to one another, in particular in a common plane of movement.

In the case of an advantageous further development of the method, it is provided that, when the swivelling movement for the workpiece grippers is carried out, at least one of the workpiece grippers carries out a superimposed rotary movement about an axis of rotation arranged at a distance from the axis of movement and aligned parallel to the axis of movement in order to adjust the distance between the workpiece grippers.

In a further configuration of the method it is provided that the first conveyor performs a continuous conveying movement during the removal of the workpieces and/or the second conveyor performs a continuous conveying movement during the pushing on of the workpieces and that the transfer system performs a phase-synchronous movement of the workpiece grippers during the removal of the workpieces and/or during the pushing on of the workpieces.

BRIEF DESCRIPTION OF THE DRAWINGS

An advantageous embodiment of the invention is shown in the drawings.

DETAILED DESCRIPTION

Figure 1:
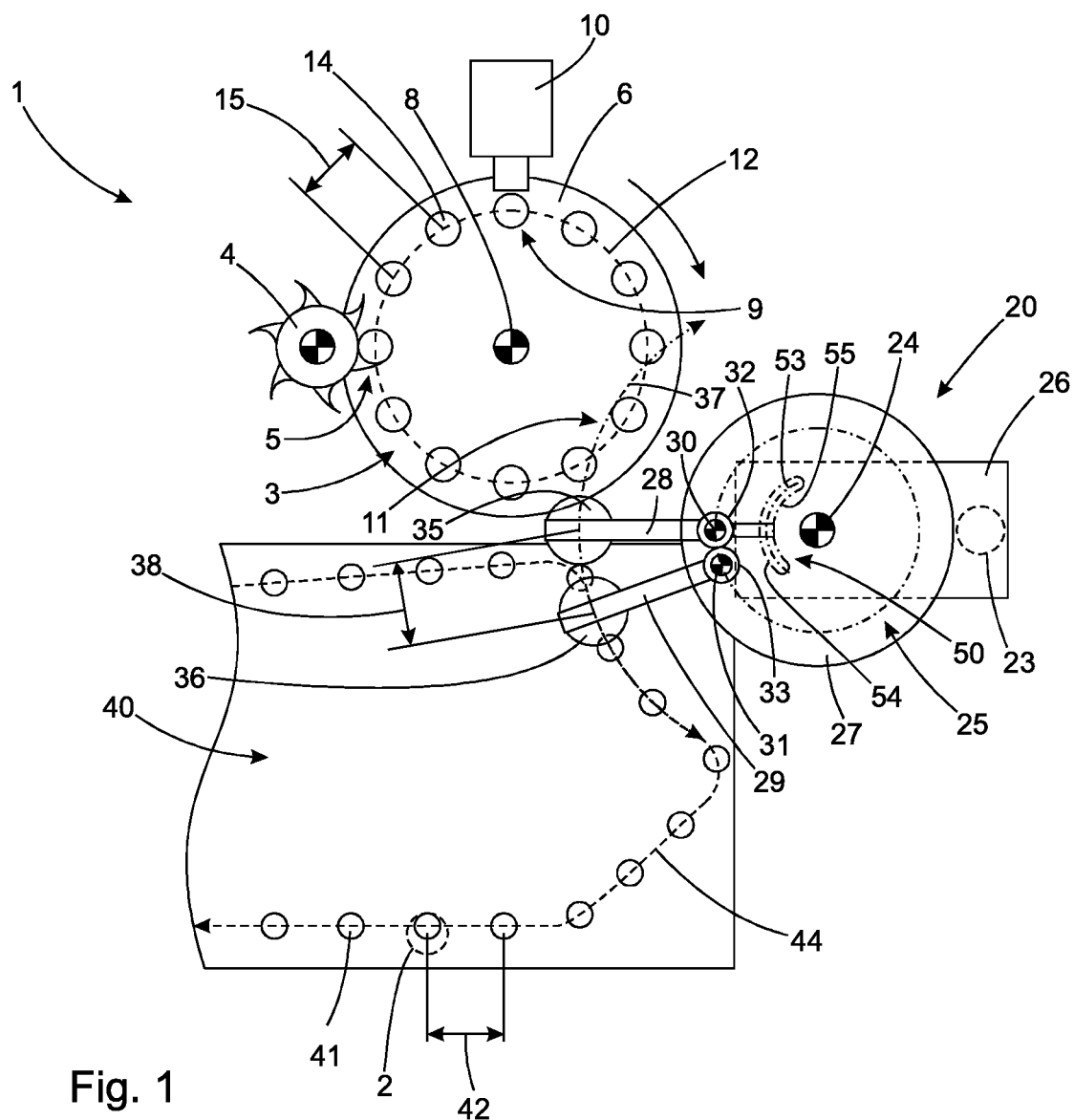
FIG. 1 shows a schematic front view of a transport system with a first conveyor, with a second conveyor and with a transfer system for supplying workpieces, which can be transported with the first conveyor, to the second conveyor, and FIG. 2 a schematic plan view of the transport system as shown in FIG. 1.
Figure 2:
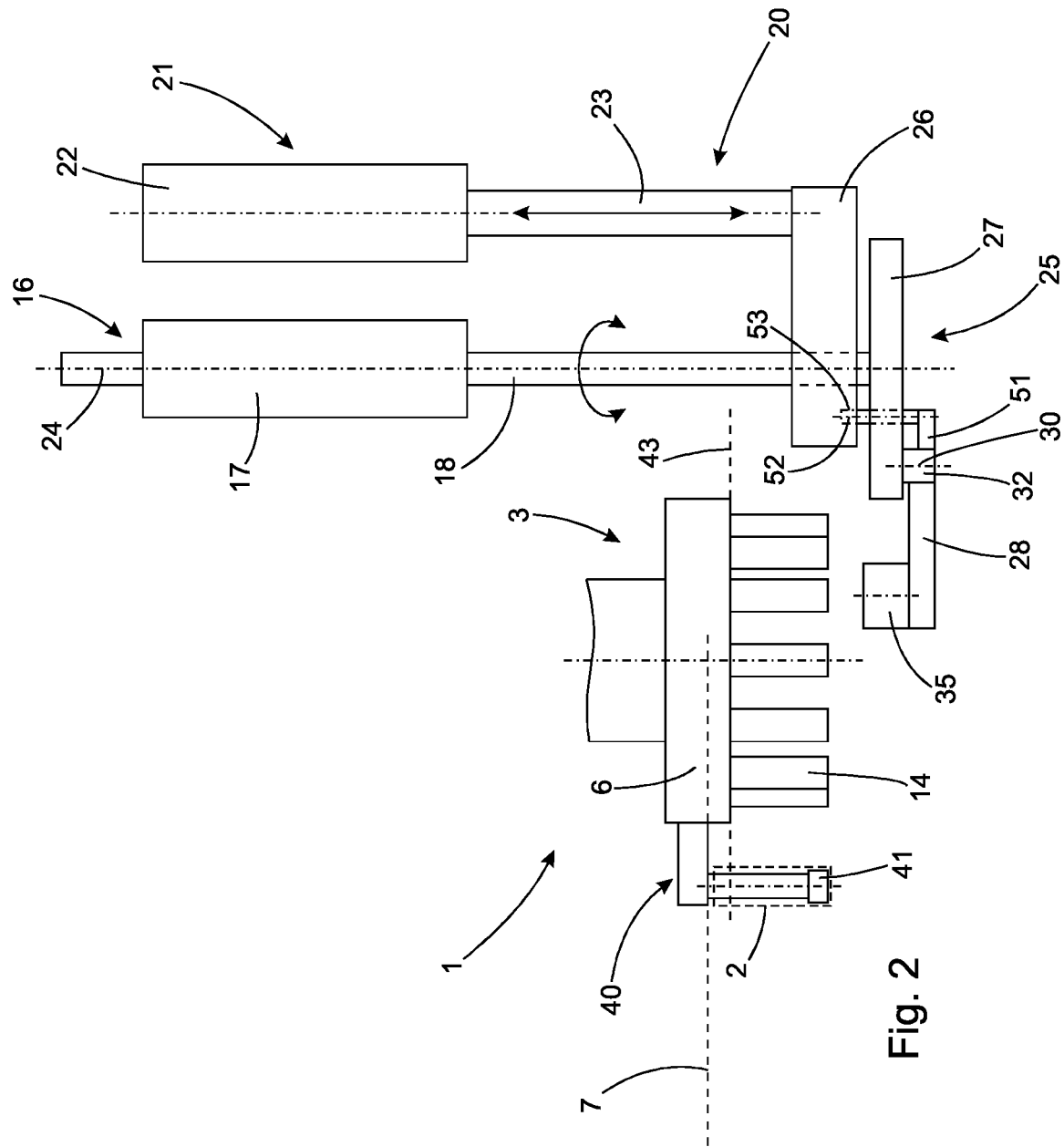

A transport system 1 shown in FIGS. 1 and 2 purely schematically, not to scale, is provided for the transport of workpieces 2, wherein the workpieces 2 are realised as circular cylindrical sleeves with a closed base area according to the exemplary representation in FIG. 2. The workpieces 2 are designed purely as examples as sleeve-shaped aerosol can blanks made of aluminium or as plastic tube blanks.

As an example, it is intended that the workpieces 2 are supplied to a first conveyor 3 with the aid of a loading star 4, which is only shown schematically and pushes the workpieces 2 at a feed position 5 onto mandrels 14 of a workpiece rotary table 6. The mandrels 14 are aligned at a 90 degree angle with respect to a transport plane 7. The workpiece rotary table 6 is designed to carry out an intermittent rotary step movement so that the workpieces 2, which are not shown in more detail and which are picked up at the mandrels 14, can be made available at several unspecified working positions, each of which is arranged at a constant angular pitch relative to a center of rotation 8. As an example, a printing system 10 is arranged at a working position 9, at which an outer surface of workpiece 2 can be printed in an inkjet printing process. Further processing operations can be carried out on the workpieces at preceding and subsequent unspecified working positions.

The mandrels 14 of the first conveyor are arranged on a common diameter 12 at a constant angular pitch, so that the mandrels 14 have a constant pitch 15 to each other.

At a discharge position 11, a transfer system 20 is used to remove the workpieces 2 from the mandrels 14. The transfer system 20 enables the workpieces 2 to be removed from the mandrels 14 and to be pushed onto the mandrels 41 of a second conveyor 40, which is designed as a chain conveyor. In this case, the mandrels 41 are each attached to unspecified hinge pins of likewise unspecified chain links and have a second pitch 42, which differs from the first pitch 15 of the first conveyor system 3. As an example, it is provided that the mandrels 41 are arranged in a transport plane 43, which is arranged parallel to transport plane 7 of the first conveyor 3.

For carrying out the transfer process, the transfer system 20 has a linear drive 21, which is designed as an electromechanical spindle drive, in which an electric drive motor, which is not described in detail, is accommodated in a drive housing 22. The drive housing 22 is connected in an unspecified manner to a machine frame which is connected in a likewise unspecified manner to the first conveyor 3 and to the second conveyor 40.

A coupling rod 23 is linearly movably mounted on the drive housing 22, inside which, for example, a lock nut can be accommodated in order to convert a rotational movement of a threaded spindle driven by the drive motor, which is also not shown in detail, into a linear movement of the coupling rod 23. The coupling rod 23 can thus perform an oscillating linear reversing movement along a movement axis 24. A gear unit 25 is attached to an end region of the coupling rod 23 remote from the drive housing 22, which comprises a rectangular base plate 26, which serves as a guidance, and a swivel body 27 which can be swivelled around the axis of movement 24 and is movably mounted on the base plate 26, which is purely exemplary in the form of a circular planeparallel plate. For example, one swivel axis of the swivel body 27 is identical to the movement axis 24.

For example, a first workpiece gripper 28 and a second workpiece gripper 29 are arranged on the swivel body 27. The first workpiece gripper 28 is mounted on the swivel body 27 so that it can rotate about a first axis of rotation 30. Furthermore, the second workpiece gripper 29 is mounted on the swivel body 27 so that it can rotate about a second axis of rotation 31. In addition, the first workpiece gripper 28 and the second workpiece gripper 29 are each provided with gear wheels 32, 33 arranged coaxially to the respective axis of rotation 30, 31 and fixed to the respective workpiece grippers 28, 29, which ensure a positive, opposing motion coupling of the two workpiece grippers 28, 29. For this purpose the two gear wheels 32, 33 each have the same diameter and identical toothing.

It is also provided that a first gripping area 35 is formed at an end area of the first workpiece gripper 28 which is turned away from the first axis of rotation 30, at which a workpiece 2 can be picked up in a manner not shown in detail. In the same way, a second gripping region 36 is formed at an end region of the second workpiece gripper 29 remote from the second axis of rotation 32, at which a workpiece 2 can be picked up in a manner not shown in more detail. As an example, the two gripping areas 35, 36 are each cup-shaped, whereby one cup opening of the gripping areas 35, 36, which can be subjected to negative pressure to fix the respective workpiece 2, faces the mandrels 14 or the mandrels 41 and is therefore not visible in FIG. 1. It is also provided that the two gripping areas 35, 36 can each be moved on sections of a swivel path 37. The swivel path 37 can be designed as a circular section as an example, but can also have a different curvature.

In order to enable the setting of a distance 38 between the first gripping area 35 and the second gripping area 36 and thus an adaptation of the transfer system 20 to the different pitches 15, 42 of the two conveyors 3, 40, a swivelling movement is provided for the two workpiece grippers 28, 29. For this purpose, the first workpiece gripper 28 is coupled with an adjuster 50 which effects an adjusting movement as a function of a swivel position of the swivel body 27 in relation to the base plate 26. For this purpose, the adjuster 50 comprises a coupling lever 51 rigidly connected to the first workpiece gripper 28, which extends purely exemplarily as an extension of the first workpiece gripper 28 and which is connected to a control pin 52 aligned parallel to the axis of movement 24. The control pin 52 passes through a recess in the swivel body 27, which is not shown in detail, and engages in a control groove 53 made in the front face of the base plate 26. The control groove 53 is only shown as a purely exemplary example; a course of the control groove 53 as well as of control surfaces 54, 55, which limit the control groove at the edge, is adapted to the requirements of the relative movement between the two workpiece grippers 28, 29.

It may be provided as an example that the control groove 53 and the control surfaces 54, 55 are designed in such a way that, during a pivoting movement of the pivoting body 27 and the workpiece grippers 28, 29 attached thereto between the first conveyor 3 and the second conveyor 40, an increase in the distance 38 between the two gripping areas 35, 36 can be effected and thus the desired change in pitch for transferring the workpieces 2 between the first conveyor 3 and the second conveyor 40 is ensured.

The provision of the swivelling movement for the swivel body 27 with respect to the base plate 26 is effected by a swivel drive 16, which comprises a swivel drive housing 17 coupled to the drive housing 22 of the linear drive 21 and a swivel shaft 18 mounted in a swivelling manner on the swivel drive housing 17. As an example, the rotary actuator 16 is designed as an electric gear motor, the rotary motion of which is reduced by a reduction gear, which is not shown in detail and which is accommodated in the rotary actuator housing 17, and is introduced as a swivel motion, for example with a swivel angle interval of 150 degrees, onto the swivel body 27. Here it is provided that the swivelling movement is provided as an oscillating reversing movement, so that, for example, two workpieces 2 can be removed in each case with every second rotary step movement of the workpiece rotary table 6 and can be provided by the transfer system 20 to the second mandrels 41 of the second conveyor 40, the second conveyor 40 being provided purely as an example for a continuous transport movement for the workpieces 2.

It is preferably provided that the control groove 53 and the control surfaces 54, 55 are designed in such a way that initially during a removal movement for the workpieces 2 from the first mandrels 14 no change in the distance 38 takes place until the workpieces 2 are completely removed from the mandrels 14. As an example, it can be provided that the linear drive 21 is deactivated at this point in time so that no further linear movement of the gear unit 25 takes place at first. Subsequently, the rotary actuator 16 is activated to initiate a swivel movement on gear unit 25. Firstly, the workpiece grippers 28, 29, which are mounted on the swivel body 27 and can be rotated, are swivelled about the movement axis 24. Furthermore, due to the forced coupling of the two workpiece grippers 28, 29 by means of the gear wheels 32, 33, under the influence of the adjustor, a change in the distance 38 of the two gripping areas 35, 36 takes place, so that the two gripping areas 35, 36 already have the distance 38, which corresponds to the pitch 42 of the second conveyor 40, before a linear approach movement is carried out to the second mandrels 41 of the second conveyor 40. Subsequently, the linear drive 21 is activated, whereby the swivel drive 16 can be controlled in such a way that a speed of movement of the two gripping areas 35, 36 corresponds to a speed of movement of the mandrels 41. Since it is further provided purely as an example that a transport path 44, which is defined by the course of the unspecified conveyor chain and the mandrels 41 attached thereto, corresponds at least in some areas with the swivel path 37 for the two gripping areas 35, 36, the workpieces 2 picked up at the gripping areas 35, 36 can be pushed onto the mandrels 41 of the second conveyor 40 without there being a relevant difference in speed and/or a deviation between the swivel path 37 and the associated section of the transport path 44. This ensures that workpieces 2 are reliably pushed onto the mandrels 41 even at high cycle rates for the transfer movement between the first conveyor 3 and the second conveyor 40.

During the subsequent resetting movement for the transfer system 20, the distance between the two gripping areas 35, 36 is changed in opposite directions, so that the gripping areas 35, 36 have the pitch 15 of the first mandrels 14 of the first conveyor 3 when linearly approaching the first mandrels 14.

What is claimed is:

1. A transfer system for removing sleeve-shaped workpieces from a first conveyor and for pushing the sleeve-shaped workpieces onto a second conveyor, having a linear drive which comprises a drive housing and a coupling rod, which is accommodated in a linearly movable manner on the drive housing, for providing a linear movement along an axis of movement, wherein a gear unit is arranged at an end region of the coupling rod remote from the drive housing, said gear unit comprising a swivel body which is mounted so as to be pivotable about the axis of movement and on which a first workpiece gripper and a second workpiece gripper are arranged so as to be rotatable about a first axis of rotation, and wherein the gear unit comprises an adjuster, which is designed for initiating an actuating movement for setting a distance between a first gripping region of the first workpiece gripper, which is arranged at a distance from the axis of movement in the radial direction, and a second gripping region of the second workpiece gripper, which is arranged at a distance from the axis of movement in the radial direction, and having a pivoting drive, which comprises a swivel drive housing coupled to the drive housing and a swivel shaft mounted on the swivel drive housing so as to be swivellably movable, the swivel shaft being designed for initiating a swivelling movement on the swivel body and for actuating the adjuster for initiating a forced swivelling movement connected to the swivelling movement on the first workpiece gripper.

2. The transfer system according to claim 1, wherein the adjuster comprises a guidance which is connected in a rotationally fixed manner to the coupling rod and which comprises at least one control surface in order to effect the forced swivelling movement as a function of the swivelling movement during a swivelling movement of the swivelling body and the first workpiece grippers and second workpiece grippers arranged thereon.

3. The transfer system according to claim 2, wherein the guidance has a control groove comprising the control surface and wherein the first workpiece gripper engages in the control groove with a control pin.

4. The transfer system according to claim 1, wherein the second workpiece gripper is mounted on the swivel body so as to be rotatable about a second axis of rotation.

5. The transfer system according to claim 4, wherein the first axis of rotation of the first workpiece gripper and the second axis of rotation of the second workpiece gripper are each arranged at an identical radial distance parallel to the axis of movement.

6. The transfer system according to claim 4, wherein the gear unit is designed for a pivot angle-dependent distance adjustment between a gripping region of the first workpiece gripper arranged at a distance from the first axis of rotation and a gripping region of the second workpiece gripper arranged at a distance from the second axis of rotation.

7. The transfer system according to claim 1, wherein the first workpiece gripper and the second workpiece gripper each comprise a gripper which has a recess which is designed for temporarily fixing a base region aligned transversely to the axis of movement and/or a sleeve section of a workpiece aligned parallel to the axis of movement, an axis of extension of the recess being aligned parallel to the axis of movement.

8. A transport system for sleeve-shaped workpieces comprising a transfer system according to claim 1, the transport system further having a first conveyor, which comprises a plurality of first mandrels with a first pitch and which is designed to provide a circulatory movement of the first mandrels along a first transport path, having a second conveyor, which comprises a plurality of second mandrels with a second pitch and which is designed to provide a circulatory movement of the second mandrels along a second transport path, wherein the first conveyor and the second conveyor are arranged in transport planes aligned parallel to one another at least in a transfer region in which the first transport path and the second transport path have a minimum distance apart, the transfer system being associated with the transfer area, and being designed for removing sleeve-shaped workpieces from the first mandrels of the first conveyor and for pushing the sleeve-shaped workpieces onto the mandrels of the second conveyor.

9. The transport system according to claim 8, wherein the gear unit is designed for a change in distance between the first workpiece gripper and the second workpiece gripper for adaptation to a pitch of the first conveyor and for adaptation to a pitch of the second conveyor.

10. A method for removing sleeve-shaped workpieces from a first conveyor and for pushing the sleeve-shaped workpieces onto a second conveyor, the method comprising:

providing workpieces with a first conveyor, which has a plurality of first mandrels with a first pitch, with a continuous or discontinuous conveying movement at a transfer region;

removing at least two workpieces at a time from the first mandrels with a first linear movement, which is carried out along an axis of movement, with at least two workpiece grippers of a transfer system, the workpiece grippers being provided on a swivel body, wherein a spacing of the workpiece grippers is adapted to the first pitch;

carrying out a pivoting movement of the swivel body with the workpiece grippers thereon, the pivoting movement being carried out about a swivel axis coincident with the axis of movement;

performing an adaptation of the spacing of the workpiece grippers to a second division of a plurality of second mandrels of a second conveyor;

pushing the workpieces onto the second mandrels of the second conveyor with a second linear movement which is carried out along the axis of movement in a direction opposite to the first linear movement, wherein the second conveyor performs a continuous or discontinuous conveying movement and wherein the first mandrels and the second mandrels are aligned parallel to one another in the transfer region and are arranged in planes of movement aligned parallel to one another, wherein, when performing the pivoting movement for the workpiece grippers, at least one of the workpiece grippers performs a superimposed rotational movement about an axis of rotation arranged at a distance from the swivel axis of the swivel body, the axis of rotation being aligned parallel to the axis of movement in order to adjust the distance between the workpiece grippers.

11. The method according to claim 10, wherein the first conveyor performs a continuous conveying movement during the removal of the workpieces and/or the second conveyor performs a continuous conveying movement during the pushing on of the workpieces, and wherein the transfer system performs a phase-synchronised movement of the workpiece grippers during the removal of the workpieces and/or during the pushing on of the workpieces.

\* \* \* \* \*